United States Patent [19]
O'Malley et al.

[11] Patent Number: 5,604,925
[45] Date of Patent: Feb. 18, 1997

[54] SUPER LOW NOISE MULTICOUPLER

[75] Inventors: John P. O'Malley, Herndon; William J. Rinard, Fairfax, both of Va.; Rodney O. Williams, Kensington, Md.

[73] Assignee: Raytheon E-Systems, Dallas, Tex.

[21] Appl. No.: 430,381

[22] Filed: Apr. 28, 1995

[51] Int. Cl.$^6$ ..................................................... H04B 7/00
[52] U.S. Cl. .................... 455/254; 455/33.1; 455/50.1; 455/283; 455/296; 330/289; 343/890; 333/99 R; 361/722
[58] Field of Search .................... 455/33.1, 50.1, 455/67.1, 82, 129, 269, 280, 283, 289, 296, 307, 254; 333/99 R, 99 S; 343/853, 890, 891; 330/289, 65, 295; 361/689, 699, 720, 722; 250/352, 370.15, 261

[56] References Cited

U.S. PATENT DOCUMENTS

| | | | |
|---|---|---|---|
| 3,389,352 | 6/1968 | Kliphuis | 333/99 R |
| 3,564,546 | 2/1971 | Barney et al. | 333/99 S |
| 3,644,803 | 2/1972 | Levi | 333/99 S |
| 3,902,143 | 8/1975 | Fletcher et al. | 333/21 R |
| 4,585,999 | 4/1986 | Hilbert et al. | 330/61 R |
| 4,763,132 | 8/1988 | Juds et al. | 343/891 |
| 4,799,067 | 1/1989 | Tekip et al. | 343/891 |
| 5,006,825 | 4/1991 | Guilbert et al. | 333/99 R |
| 5,093,311 | 3/1992 | Shiota et al. | 505/232 |
| 5,244,869 | 9/1993 | Billing | 505/202 |
| 5,262,395 | 11/1993 | Ginley et al. | 330/252 |
| 5,378,999 | 1/1995 | Martens et al. | 330/295 |

FOREIGN PATENT DOCUMENTS

| | | | |
|---|---|---|---|
| 566282 | 2/1977 | U.S.S.R. | 333/99 S |

OTHER PUBLICATIONS

Little, W. A. & Sapozhnikov, I.; "Development of a Low Cost, Cryogenic Refrigeration System for Cooling of Cryoelectronics"; pp. 1–8. 1994.

*Primary Examiner*—Reinhard J. Eisenzopf
*Assistant Examiner*—Doris To
*Attorney, Agent, or Firm*—Rogers & Killeen

[57] ABSTRACT

A method and multicoupler for a receiver at a base station in a cellular/PCS radio communication system includes a cooled container that is mounted on an antenna tower at the base station. The container is mounted on the antenna tower adjacent an antenna and contains thereinside a preselector filter, a highly linear amplifier, and a directional coupler that are cooled to a temperature less than 175° K. and greater than 100° K. A power splitter is connected between the output from the container and the radio system receiver, and is located at a ground station near the base of the antenna tower. Cooling the components inside the container, particularly the amplifier, to a temperature of about 150° K. reduces the noise from the multicoupler so that base station range is extended, building penetration is improved, and subscriber transmit power may be reduced. The multicoupler may also be used for duplex channels, and in this event a transmit filter may also be cooled to reduce transmit power dissipation by the filter.

26 Claims, 1 Drawing Sheet

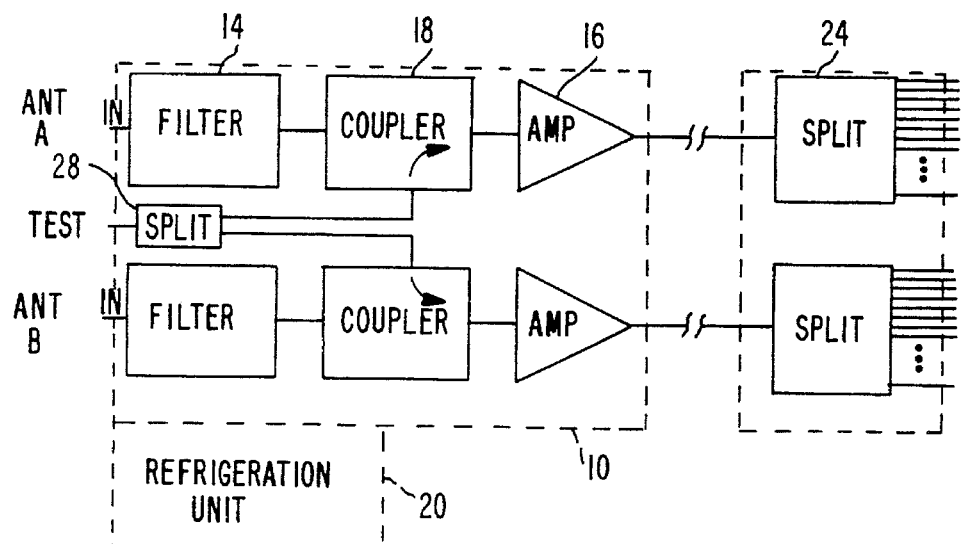
FIG. 1
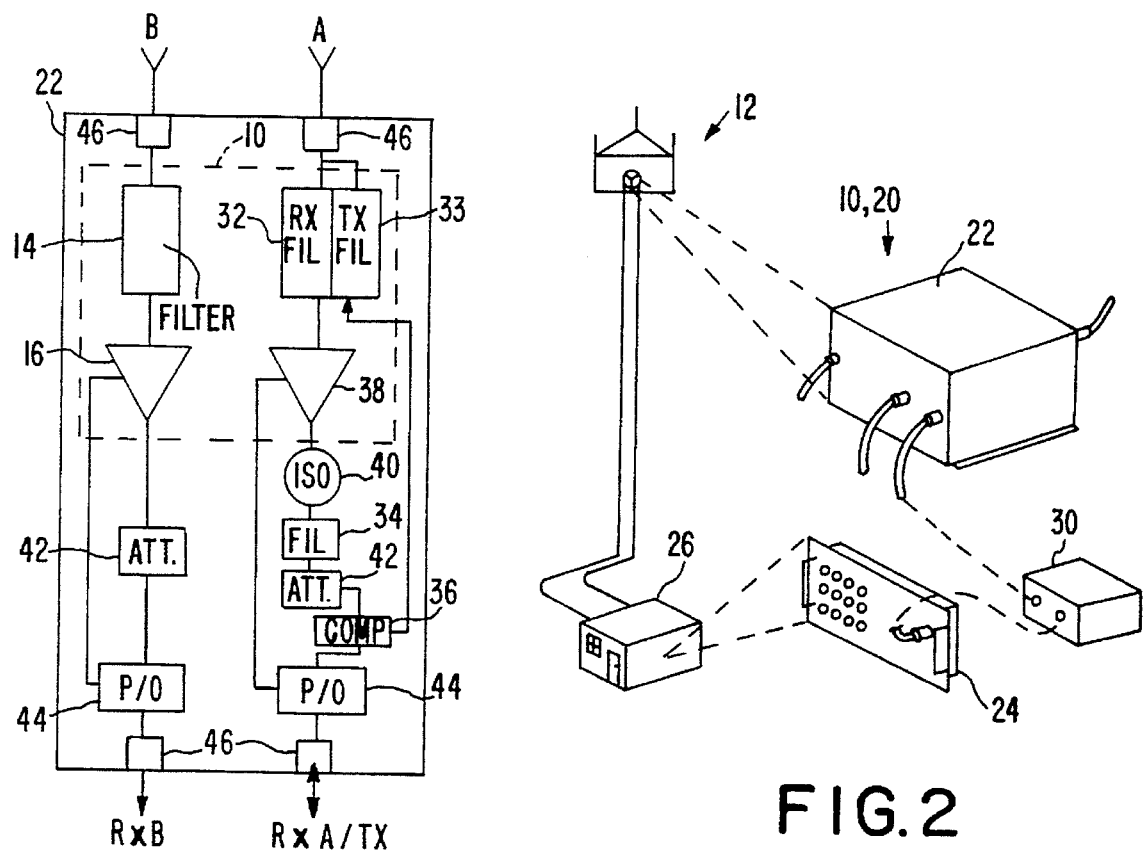
FIG. 2
FIG. 3

SUPER LOW NOISE MULTICOUPLER

BACKGROUND OF THE INVENTION

The present invention relates to multicouplers and methods for increasing the range of receivers in radio communication systems, and more particularly to a multicoupler and method for a cellular/PCS communication system in which antenna-tower mounted multicoupler components are cooled to reduce noise, thereby increasing base station range.

As is known, the performance of some electronic components improves as the temperature of the device decreases. For example, materials that exhibit greatly improved performance at less than about 77° K. are known as superconductors. Superconductor materials only exhibit their "zero resistance" when operated below a critical temperature. The use of such materials in radio systems is known, although the use is limited due to the complexity and cost of maintaining the proper device temperature. See, for example, the selective filter system in U.S. Pat. No. 5,244,869 issued to Billing Sep. 14, 1993 in which improved performance is achieved by using various types of superconductor materials that operate at low superconductor temperatures (e.g., 4° K.) or high superconductor temperatures (e.g., 70°–75° K.).

Cooling to about 150° K. provides many of the benefits of superconductivity, and recent developments in cooling technology have made this temperature achievable in a relatively small closed-system unit. For example, a cascade mixed gas throttle expansion cycle refrigeration unit is discussed in "Development of a Low Cost, Cryogenic Refrigeration System for Cooling of Cryoelectronics", W.A. Little and I. Sapozhnikov (MMR Technologies, Inc., Mountain View Calif).

Some radio components, such as amplifiers, that are already low noise amplifiers may have their noise further reduced by cooling. However, low noise amplifiers typically exhibit less than desirable dynamic range, or linearity, for many radio applications, such as cellular/PCS systems that are susceptible to distortion from a multiplicity of high powered signals. Cellular/PCS systems typically operate at 1800–1900 MHz where signal propagation losses are higher than in other cellular systems that operate at 800 MHz. High dynamic range, or highly linear, amplifiers that are used for receivers in cellular/PCS systems do not demonstrate low noise performance, and it is desirable that they do so. While the use of superconductor materials may provide improved performance for cellular/PCS systems, the cost of installing superconductor materials and cooling systems in amplifiers of the receivers at each site in a cellular/PCS system, if it could be done at all, would far outweigh the cost benefits of any improvement.

Nevertheless, it is desirable to increase the sensitivity of receivers in cellular/PCS systems (i.e., extend their range) to thereby reduce the number of sites for the receivers. The present invention finds application in receivers in cellular/PCS systems and in other radio systems where the improvements available from the invention may be beneficial.

Accordingly, it is an object of the present invention to provide a novel method and multicoupler for a receiver at a base station in a radio communication system that obviates the problems of the prior art.

It is another object of the present invention to provide a novel method and multicoupler for a receiver in which a container for a highly linear amplifier is cooled to between 100° K. and 175° K. and mounted on an antenna tower adjacent an antenna for reducing amplifier noise and thereby increasing receiver range.

It is yet another object of the present invention to provide a novel method and multicoupler for a receiver in which a preselector filter, a highly linear amplifier, a directional coupler, and the connections therebetween are in a container that is cooled to about 150° K. and mounted on an antenna tower.

It is still another object of the present invention to provide a novel method and multicoupler for a cellular/PCS receiver in which subscriber handset power may be reduced and building penetration improved due to improved base station sensitivity achieved through cooling a multicoupler amplifier and mounting the cooler amplifier on an antenna tower adjacent an antenna.

It is a further object of the present invention to provide a novel method and multicoupler for a receiver in which a container for a highly linear amplifier is cooled to between 100° K. and 175° K. and mounted on an antenna tower adjacent an antenna for reducing amplifier noise and required gain, and in which a second amplifier at a ground station increases received signal gain without significantly increasing noise.

It is yet a further object of the present invention to provide a novel method and multicoupler for a receiver in which a preselector filter, and a highly linear amplifier are in a container that is cooled to between 100° K. and 175° K., where the filter is a cavity filter with plural sections.

It is still a further object of the present invention to provide a novel method and multicoupler for a receiver in which a preselector filter, and a highly linear amplifier are in a container that is cooled to between 100° K. and 175° K. by a closed-system cooler with a selector for setting a specific temperature within the range.

It is an additional object of the present invention to provide a novel method and multicoupler for a duplex antenna channel in which a transmit filter, a receive filter and an amplifier are cooled in a container located adjacent an antenna on a tower so that power dissipated by the transmit filter is reduced.

These and many other objects and advantages of the present invention will be readily apparent to one skilled in the art to which the invention pertains from a perusal of the claims, the appended drawings, and the following detailed description of the preferred embodiments.

BRIEF DESCRIPTION OF THE DRAWINGS

FIG. 1 is a block diagram of an embodiment of the present invention.

FIG. 2 is an illustration of an embodiment of the present invention.

FIG. 3 is a block diagram of a duplex embodiment of the present invention.

DESCRIPTION OF PREFERRED EMBODIMENTS

With reference now to FIGS. 1 and 2, an embodiment of the present invention may include a cooled container 10 that is mounted on an antenna tower 12 at a base station in a radio communication system. Container 10 may be mounted on antenna tower 12 adjacent an antenna and be connected to an antenna feed. Container 10 may contain thereinside a preselector filter 14 connected to the antenna feed, a highly linear amplifier 16 connected to an output from container 10, and an optional directional coupler 18 for injecting a test signal that may be connected appropriately (e.g., between filter 14 and amplifier 16 or before filter 14.) A refrigeration unit 20 for cooling the contents of container 10 may be inside container 10 or adjacent thereto. Refrigeration unit 20 cools the interior of container 10 to a temperature less than 175° K. and greater than 100° K., and desirably maintains the components inside container 10 at 150° K. ±2°. Container 10 and refrigeration unit 20 are desirably protected from the environment encountered on the antenna tower and to this end may be encapsulated in a sealed package 22. The embodiment of FIG. 1 includes components for two antennae in container 10, although components for any number of antennae may be inside container 10. A power splitter 24 may be connected between the output from container 10 and the radio system receiver(s). Power splitter 24 need not be cooled and is desirably located at a ground station 26 near the base of antenna tower 12.

In operation, the improved performance of the present invention is attributable to several factors, most noticeable being (1) reduced noise in filters 14, couplers 18, amplifiers 16 and their interconnects within container 10 through cooling, and (2) reduced noise due to locating cooled amplifier 16 near the antennae to mitigate noise contributions from long cable runs. The improved sensitivity of the base station receiver (i.e., extended range) means that subscriber handset power may be reduced, and that building penetration is improved.

In a preferred embodiment the filter 14 is a front end band-pass filter with a very narrow bandwidth (down to 0.26%) with very high Q resonators to provide low insertion loss. The filter may be a multi-section (e.g., five section) cavity filter centered on a particular frequency band, for example, the B-band. By operating the filter at low temperature (desirably 150° K.) ultra low loss and high selectivity suitable for cellular/PCS systems may be attained.

The amplifier 16 may be a robust MESFET, HEMT or MMIC medium power amplifier. When operated at low temperatures (e.g., 150° K.) the amplifier may provide a gain of about 36 dB and a noise of less than 1 dB in the B-band.

Refrigeration unit 20 may be a cooling system that maintains the temperature of the container 10 to a predetermined temperature, for example, 150° K. ±2°. The cooling system desirably includes a set-point temperature that is programmable. Refrigeration unit 20 is preferably a closed system that takes advantage of current advances in refrigeration technology so that it is small and requires little or no maintenance over its anticipated life. For example, the refrigeration unit 20 may employ the cascade mixed gas throttle expansion cycle discussed in the above reference article by Little and Sapozhnikov, or other suitable systems. The power supply for the refrigeration unit may be provided on antenna tower 12 conventionally as such towers are typically pre-wired or have provisions for adding supply lines.

The directional coupler 18 may be a 30 dB directional coupler inserted between the antenna and amplifier 16 to provide a test signal injection port. It may have input for a built-in test signal that may be received from a splitter 28 that feeds the couplers 18 for each of the antennae. Preferably coupler 18 is a parallel coupled rod type coupler.

Power splitter 24 may be a strip line design splitter with multiple outputs per antenna feed.

In operation, cooling each component contributes to overall system improvement, but in different ways. Highly linear amplifier 16 provides the benefit of reduced noise when operated at low temperatures. While it has been known to apply cooling to amplifiers that are already low noise amplifiers to make them have even lower noise, the amplifier in a cellular/PCS station receive path is susceptible to generating distortion signals from the presence of multiple high powered signals (e.g., signals>60 dB above receiver sensitivity), therefore a high dynamic range, or highly linear, or high powered amplifier is desirable in the receive path to minimize this phenomena. This type of amplifier does not generally demonstrate low-noise performance, and conversely, low-noise amplifiers typically exhibited less than desirable dynamic range or linearity for cellular applications. The cooling of amplifier 16 in the present invention allows a highly linear amplifier to also exhibit very low noise characteristics.

Filter 14 typically has a controlled frequency response when used in a cellular/PCS radio system, and such filters are sensitive to fluctuation in temperatures. A filter mounted on an antenna tower must stay on frequency regardless of the season-to-season and day-to-night temperature extremes. By cooling and maintaining the temperature of filter 14, filter 14 will stay tuned to the correct receive band and may be designed with a sharper passband since it will not have to operate in a varying temperature environment. In addition, filter 14 exhibits reduced electrical loss due to the slight increase in conductivity of its metal surfaces at low temperatures. This benefit enhances the already reduced system noise.

Any additional gain that may be required for a particular application can be provided by adding another uncooled amplifier 30 at the ground station 26 between the connection of amplifier 16 to power splitter 24. Because of the mathematical relationship of noise and gain, second amplifier 30 can have a higher noise figure with a virtually insignificant contribution to overall system noise, preserving the range extension of the present invention.

With reference now to FIG. 3, a further embodiment of the present invention may be used in a duplex configuration. Antenna A may be used for both receiving and transmitting (by way of comparison, antenna B is a receive only). The duplex embodiment may include two separate filters, a receive band filter 32 and a transmit band filter 33, that are connected in parallel and appropriately impedance and phase matched. A further filter 34 may attenuate a transmit band and pass a receive band, and isolate transmit power. A directional coupler 36 may recombine the transmit and receive paths within the container 22 mounted on antenna tower 12. Within coupler 36, the transmit path may be the "through" path which has less loss than the "coupled" path that may be used for the receive path (e.g., the "coupled" path may have 10 dB or more coupling attenuation). Filters 32 and 33 and a receive band amplifier 38 may be cooled in container 10 as discussed above. An isolator 40 may provide impedance matching for amplifier 38 output, and isolate transmit power from amplifier 38 output. Attenuator 42 may reduce reflection of transmit power to transmit amplifier located in ground station 26. A bias voltage pickoff 44 provides power for amplifier 38. Lightning arrestors 46 may also be provided.

Cooling filter 33 reduces loss that can lead to transmit power savings. For example, if a 100 Watt transmitter uses a duplex filter 33 with 0.7 dB of loss, and if cooling reduces that loss to 0.3 dB, power dissipated by filter 33 is reduced from almost 15 Watts to less than 7 Watts.

As will be appreciated, the cellular/PCS communication market is highly competitive and typically includes the latest technology. However, a cooled, antenna tower-mounted, amplifier for a receiver in a cellular/PCS radio communication systems has not been available. The present invention fills this long-felt need by combining advanced cooling technology with radio technology so that performance may be economically improved. For cellular/PCS systems, the benefits are obvious: cell spacing may be increased, therefore fewer base stations are required to service a particular area; subscriber handset power may be reduced; building penetration is improved; and sensitivity within the service area is improved, increasing the satisfaction of the system's customers.

While preferred embodiments of the present invention have been described, it is to be understood that the embodiments described are illustrative only and the scope of the invention is to be defined solely by the appended claims when accorded a full range of equivalence, many variations and modifications naturally occurring to those of skill in the art from a perusal hereof.

What is claimed is:

1. A multicoupler for a receiver at a base station in a radio communication system, the base station having an antenna tower and a ground station adjacent a base of the antenna tower, said multicoupler comprising:
    a cooled container on the antenna tower adjacent an antenna, said cooled container comprising thereinside,
        a preselector filter connected to a feed from the antenna, and
        a highly linear amplifier connected to said filter and to an output from said cooled container; and
    a refrigeration unit for cooling said filter, said amplifier and connections therebetween to a temperature less than 175° K. and greater than 100° K.; and
    a power splitter connected between said output from said cooled container and the receiver.

2. The multicoupler of claim 1 wherein said power splitter is at the ground station.

3. The multicoupler of claim 2 further comprising a second amplifier at the ground station that is connected between said output from said cooled container and said power splitter for increasing received signal gain without significantly increasing noise.

4. The multicoupler of claim 1 further comprising inside said cooled container a second preselector filter connected to a feed from a second antenna, and a second highly linear amplifier connected to a second output from said cooled container, and a second power splitter that is connected to said second output from said cooled container.

5. The multicoupler of claim 1 wherein said filter comprises one of a cavity filter with plural sections, or a ceramic puck filter.

6. The multicoupler of claim 1 further comprising a coupler connected to said filter for injecting a test signal.

7. The multicoupler of claim 6 wherein said coupler comprises a parallel coupled rod type coupler.

8. The multicoupler of claim 1 wherein said amplifier comprises one of a MESFET, HEMT and MMIC amplifier.

9. The multicoupler of claim 1 wherein said temperature is about 150° K.

10. The multicoupler of claim 1 wherein said refrigeration unit comprises a closed-system cooler, and means for maintaining a predetermined temperature within the range of less than 175° K. and greater than 100° K.

11. The multicoupler of claim 1 wherein said filter comprises a transmit filter and receive filter, and further comprising means for isolating said receive filter from a source of transmit power, whereby the multicoupler is for operation in a duplex antenna system.

12. An antenna tower-mounted multicoupler for a receiver in a cellular/PCS radio communication system, said multicoupler comprising:
    a first, highly linear, amplifier on an antenna tower adjacent an antenna, said first amplifier being connected to a feed from the antenna;
    a refrigeration unit adjacent said first amplifier on the antenna tower for cooling said first amplifier to a predetermined temperature between 175° K., and 100° K. so that noise from said first amplifier is reduced; and
    means for providing a radio signal received at the antenna from said first amplifier to a receiver, said means for providing and the receiver being located at a ground station adjacent a base of the antenna tower.

13. The multicoupler of claim 12 further comprising a transmit filter and a parallel connected receive filter that are connected between said first amplifier and the antenna feed and cooled by said refrigeration unit for enabling duplex operation of the multicoupler.

14. The multicoupler of claim 13 further comprising means for isolating said receive filter from a source of transmit power.

15. The multicoupler of claim 12 further comprising a second, uncooled, amplifier at the ground station, said second amplifier being connected between said first amplifier and the receiver, said second amplifier for increasing the gain of the signal from said first amplifier without significantly increasing noise.

16. The multicoupler of claim 15 wherein said means for providing comprises a power splitter connected between said second amplifier and the receiver.

17. The multicoupler of claim 16 further comprising a preselector filter connected between the feed from the antenna and said first amplifier adjacent said refrigeration unit with said first amplifier.

18. The multicoupler of claim 17 further comprising a directional coupler for injecting a test signal that is connected between said filter and said first amplifier adjacent said refrigeration unit.

19. A method of increasing sensitivity of a receiver at a base station in a radio communication system, the base station having an antenna tower and a ground station adjacent a base of the antenna tower, the method comprising the steps of:
    (a) providing a cooled container on the antenna tower adjacent an antenna;
    (b) providing inside the cooled container,
        a filter connected to a feed from the antenna, and
        a highly linear first amplifier connected to an output from the cooled container; and
    (c) cooling the filter, the first amplifier, and connections therebetween that are inside the cooled container to a predetermined temperature less than 175° K. and greater than 100° K.; and
    (d) connecting a power splitter between the output from the cooled container and the receiver.

20. The method of claim 19 further comprising the step of providing a second, uncooled, amplifier at the ground station, the second amplifier being connected between the output of the cooled container and the power splitter, the second amplifier for increasing the gain of the signal from the first amplifier without significantly increasing noise.

21. The method of claim 19 wherein the filter includes a transmit filter and a parallel connected receive filter, and further comprising the step of isolating the receive filter from a source of transmit power, for enabling duplex operation.

22. The method of claim 19 wherein the filter comprises one of a cavity filter with plural sections, or ceramic puck filter.

23. The method of claim 19 further comprising the step of providing a directional rod type coupler between the antenna and the amplifier for injecting a test signal.

24. The method of claim 19 wherein the amplifier comprises one of a MESFET, HEMT and MMIC amplifier.

25. The method of claim 19 wherein the predetermined temperature is about 150° K.

26. The method of claim 19 further comprising the step of providing a closed-system cooler for cooling the cooled container, the cooler having means for selecting the predetermined temperature.

* * * * *